United States Patent
Mirtorabi et al.

(10) Patent No.: US 7,804,848 B2
(45) Date of Patent: Sep. 28, 2010

(54) SETTING A FORWARDING ADDRESS IN AN INTERNET PROTOCOL VERSION 6 (IPV6) ROUTING PROTOCOL DOMAIN AT A BOUNDARY WITH A DIFFERENT ROUTING PROTOCOL DOMAIN

(75) Inventors: Sina Mirtorabi, Santa Clara, CA (US); Abhav Roy, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 570 days.

(21) Appl. No.: 11/679,864

(22) Filed: Feb. 28, 2007

(65) Prior Publication Data

US 2008/0205401 A1    Aug. 28, 2008

(51) Int. Cl.
*H04J 3/16* (2006.01)
(52) U.S. Cl. ..................... 370/466
(58) Field of Classification Search ............ None
See application file for complete search history.

(56) References Cited

U.S. PATENT DOCUMENTS

| | | | | |
|---|---|---|---|---|
| 5,420,862 | A * | 5/1995 | Perlman | 370/401 |
| 6,081,836 | A * | 6/2000 | Karapetkov et al. | 709/218 |
| 6,418,476 | B1 | 7/2002 | Luciani | |
| 7,386,010 | B2 * | 6/2008 | Solomon et al. | 370/466 |
| 2001/0040895 | A1 * | 11/2001 | Templin | 370/466 |
| 2002/0013858 | A1 * | 1/2002 | Anderson | 709/245 |
| 2004/0162914 | A1 * | 8/2004 | St. Pierre et al. | 709/245 |
| 2004/0170182 | A1 * | 9/2004 | Higashida et al. | 370/401 |
| 2004/0213234 | A1 * | 10/2004 | Koch et al. | 370/392 |
| 2005/0076145 | A1 * | 4/2005 | Ben-Zvi et al. | 709/245 |
| 2005/0243828 | A1 * | 11/2005 | Tsuchiya et al. | 370/392 |
| 2006/0056446 | A1 * | 3/2006 | Lee et al. | 370/465 |

(Continued)

FOREIGN PATENT DOCUMENTS

WO    WO 2008/121452    10/2008

OTHER PUBLICATIONS

R. Coltun, D. Ferguson and J. Moy, OSPF for IPv6, RFC/RFC2740. txt, Dec. 1, 1999, p. 80pp, Publisher: Internet Engineering Task Force, Published in: Internet, www.ietf.org.

(Continued)

*Primary Examiner*—Ayaz R Sheikh
*Assistant Examiner*—Faiyazkhan Ghafoerkhan
(74) *Attorney, Agent, or Firm*—Patent Capital Group

(57) ABSTRACT

In one embodiment, a method includes receiving a neighbor discovery message and a border routing message through an interface at a particular router. The interface communicates with a border network segment between first nodes routing with IPv6 using a first routing protocol and different second nodes routing using a different routing protocol. The messages are received from an alien router. The border routing message includes foreign routing data that indicates a route among the second nodes. If the alien router's interface on the border segment does not have a global IPv6 address, then a fictive IPv6 address is generated, which includes a global prefix of an IPv6 address for the particular router and an interface identifier associated with the alien router. The fictive IPv6 address and the foreign routing data are inserted into a domain scope external advertisement message that is sent to the first nodes.

17 Claims, 4 Drawing Sheets

U.S. PATENT DOCUMENTS

2006/0274751 A1    12/2006  Tsuchiya et al.
2006/0291446 A1    12/2006  Caldwell et al.
2007/0099649 A1*    5/2007  Han et al. .................... 455/525
2007/0124486 A1*    5/2007  Jeon et al. .................... 709/230
2007/0171842 A1*    7/2007  Dow .......................... 370/254

OTHER PUBLICATIONS

Notification of Transmittal of the International Search Report and the Written Opinion of the International Searching Authority, or the Declaration (1 page) and International Search Report (2 pages) for International Application No. PCT/US08/54235 mailed Aug. 29, 2008.

Notification Concerning Transmittal of International Preliminary Report on Patentability (1 page), International Preliminary Report on Patentability (1 page), and Written Opinion of the International Searching Authority (5 pages) for International Application No. PCT/US08/54235 mailed Sep. 11, 2009.

* cited by examiner

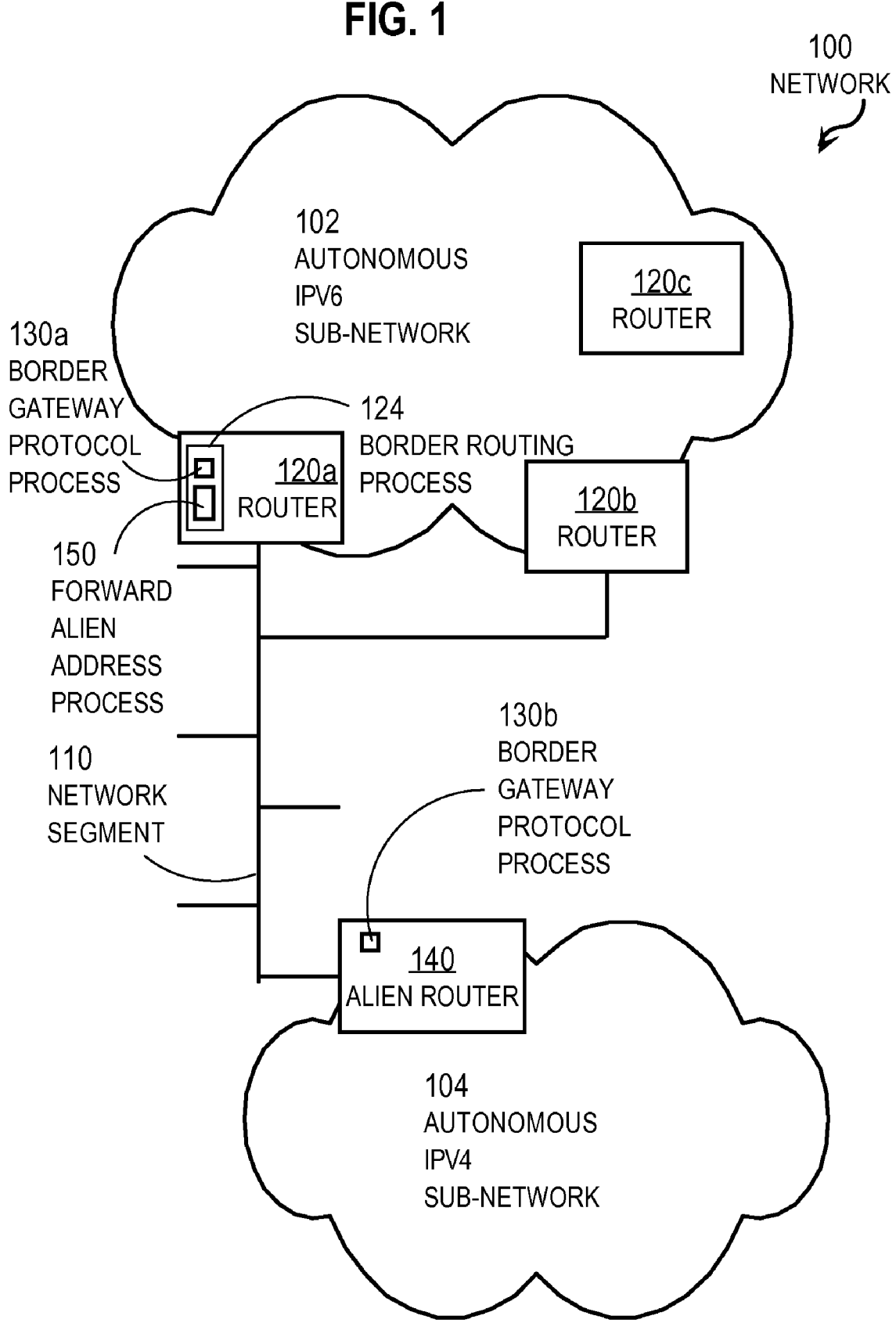

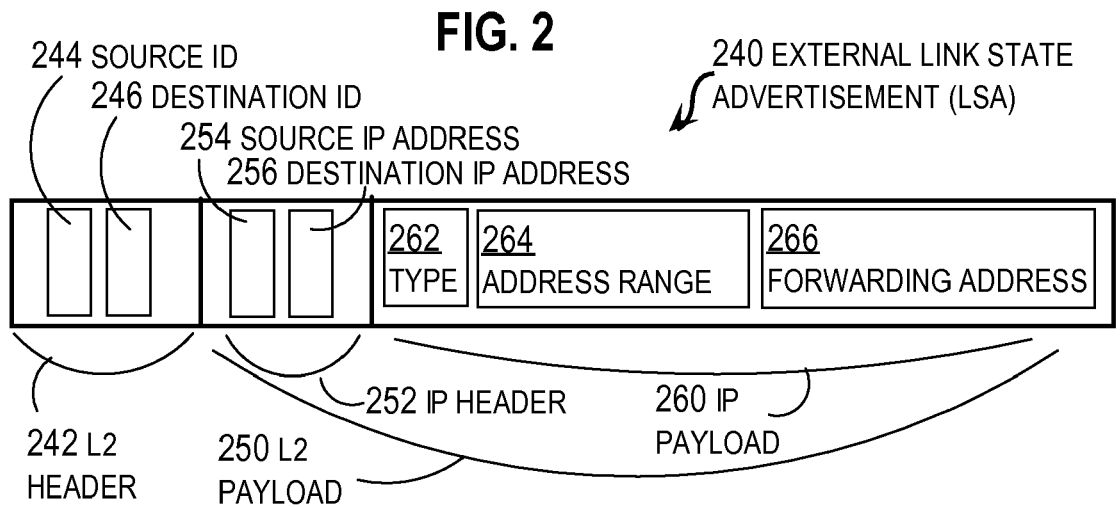
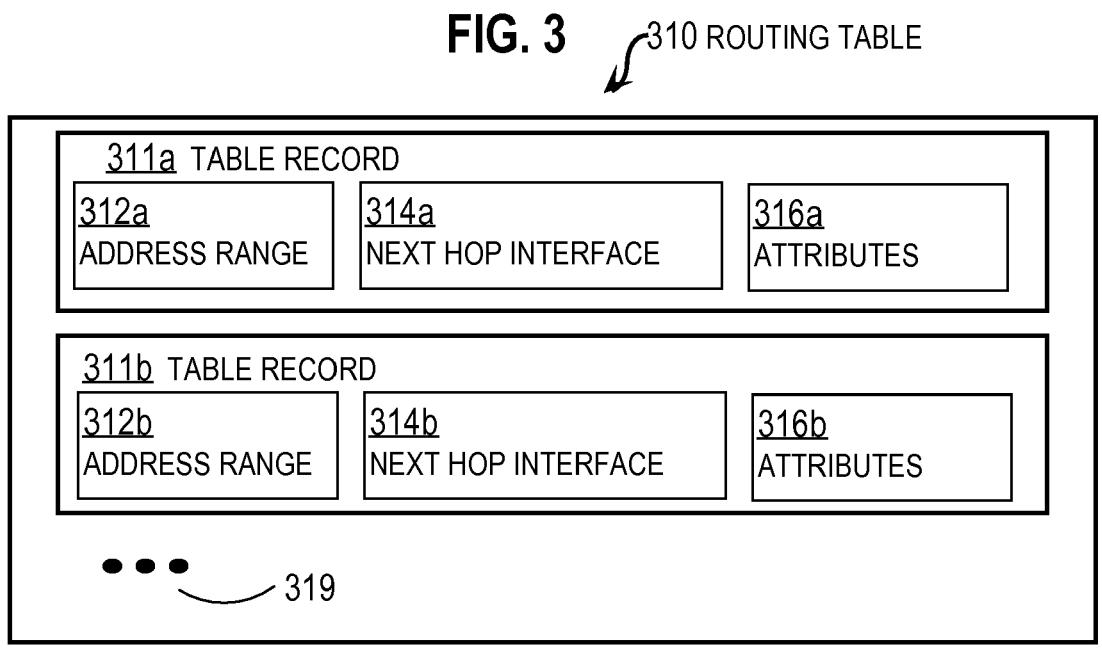

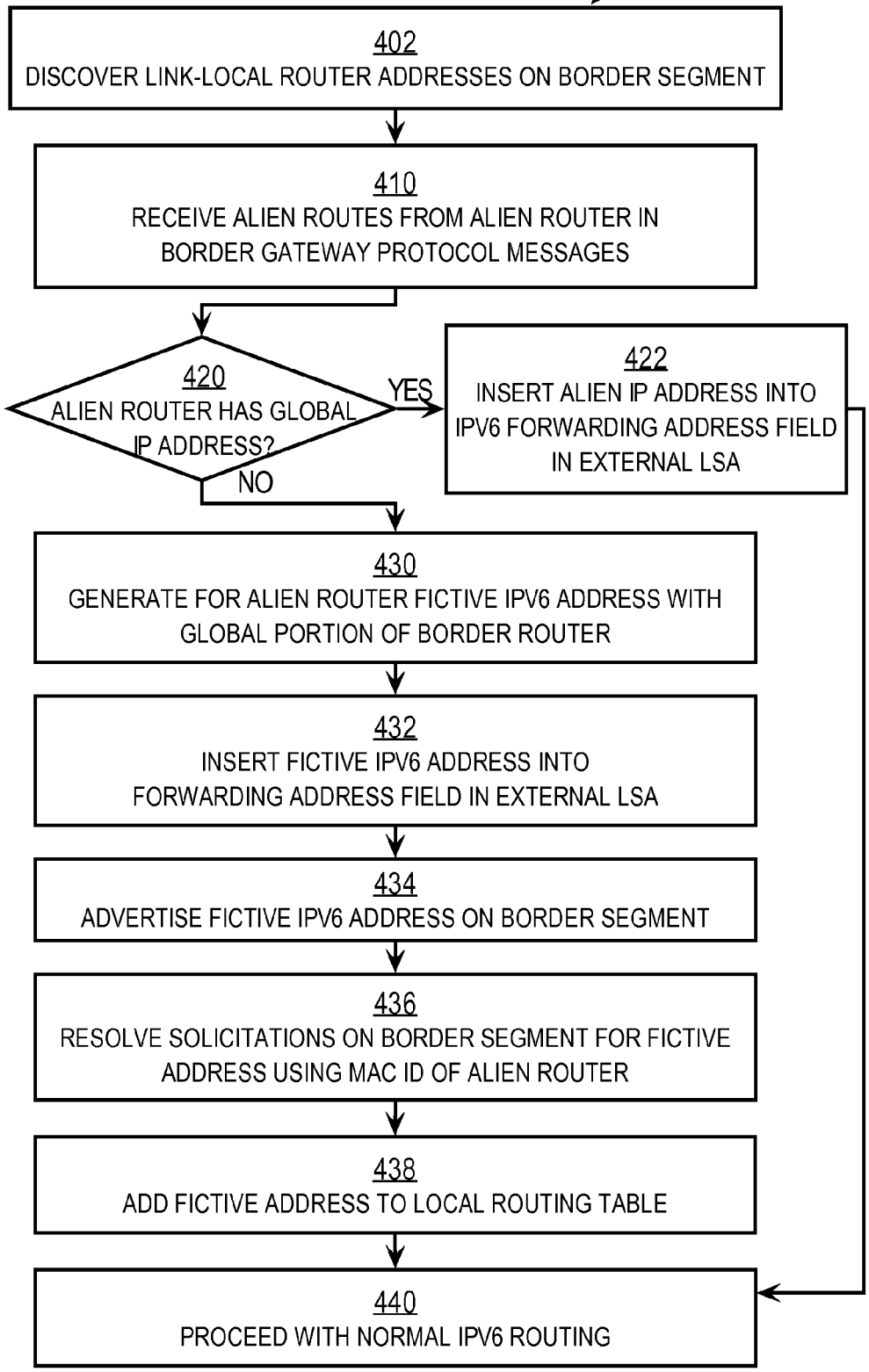

SETTING A FORWARDING ADDRESS IN AN INTERNET PROTOCOL VERSION 6 (IPV6) ROUTING PROTOCOL DOMAIN AT A BOUNDARY WITH A DIFFERENT ROUTING PROTOCOL DOMAIN

BACKGROUND OF THE INVENTION

1. Field of the Invention

The present invention relates to exchanging routing information across a border between two autonomous systems using different routing protocols for packet switched networks.

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links.

A link-state protocol is an example of a routing protocol, which only exchanges control plane messages used for routing data packets sent in a different routed protocol (e.g., the Internet Protocol, IP). To reduce the consumption of network resources and improve scalability, some routing protocols divide a large network up into smaller subnetworks. For example, the Open System Interconnection (OSI) protocol suite and the Open Shortest Path First (OSPF) routing protocol divide a network into domains and areas. A domain is a portion of a network under the network administration of a single authority, such as an enterprise or Internet service provider (ISP). A domain is also called an autonomous system (AS).

In an internetwork, networks in different autonomous systems (AS) also route data packets among each other. Routing information for an AS is summarized at its boundaries with one or more other ASs at intermediate network nodes called border gateway nodes or border gateway routers (BR).

When an AS border gateway router (ASBR) generate messages to internally advertise external routes it learns from an adjacent AS, it currently is able to set a forwarding address (FA) field in the message. The forwarding address is typically set for multi-access links between different AS, where by definition there can be more than one router of the same AS connected to the link with the different AS. Using the address in the FA field, other routers in the AS can determine when there is a better route to the different AS than through the ASBR. Use of the better route avoids performing one or more extra hops, and is called optimal routing herein.

The Internet Protocol (IP) is a routed protocol that assigns logical addresses to network nodes, which are easily nested in subnetworks of contiguous addresses that is advantageous for routing. IP version 4 (IPv4) addresses are the most widely used and are represented by four octets of binary digits (bits); each octet is 8 bits that represent decimal values from 0 through 255. Thus an IPv4 address has 32 bits. IPv4 supports $2^{32}$ (about 4.3 billion) addresses, which is inadequate for giving even one address to every living person, much less for supporting a separate address for each connected device. IP version 6 (IPv6) has been introduced with 128-bit addresses in part to eliminate this problem.

Some routing protocols, such as OSPFv3, have been enhanced to use the IPv6 addresses. However, when the border router (BR) on the different AS does not have a global IP address, the forwarding address can not be utilized by current IPv6 routing protocols; and optimal routing is not available.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 illustrates an example network with a border gateway router between sub-networks of different autonomous systems;

FIG. 2 illustrates an example domain scope advertisement message;

FIG. 3 illustrates an example routing table;

FIG. 4 illustrates an example method for producing an IPv6 forwarding message for an alien border gateway router using a different routing protocol.

DESCRIPTION OF EXAMPLE EMBODIMENTS

Figure 5:
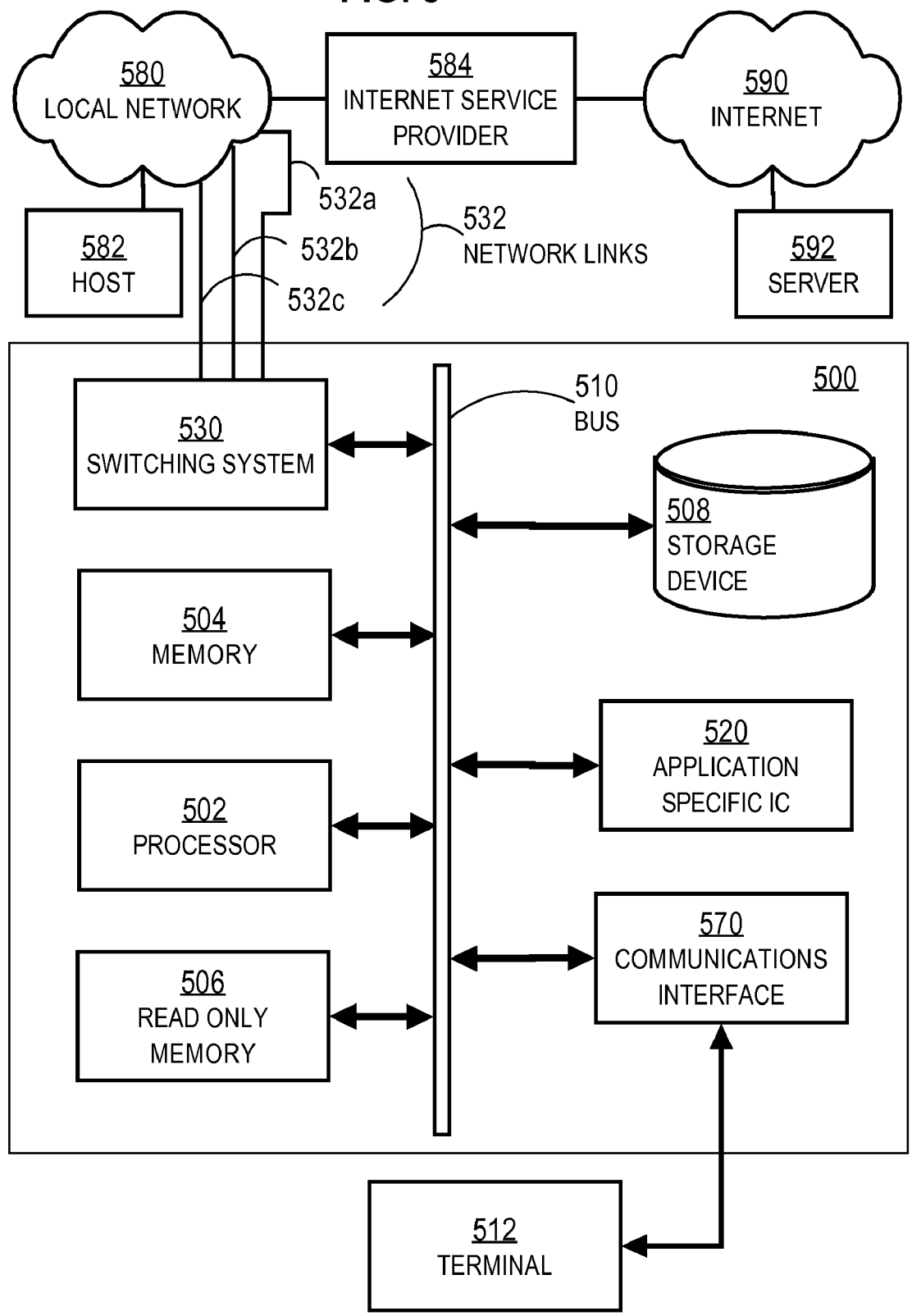
FIG. 5 illustrates a computer system upon which an embodiment of the invention may be implemented.

A method and apparatus are described for setting a forwarding address in an IPv6 domain at a boundary with a domain using a different routing protocol. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

An embodiment of the present invention is described in the context of OSPFv3 as an IPv6 routing protocol and EIGRP as an IPv4 routing protocol, however, the invention is not limited to this context. In other embodiments, any IPv6 routing protocol that uses a forwarding address is used in conjunction with any different routing protocol.

1.0 OVERVIEW

In one set of embodiments, a method includes receiving a neighbor discovery message and a border routing message through an interface at a particular router. The interface communicates with a border network segment between first nodes routing with IPv6 using a first routing protocol and different second nodes routing using a different, second routing protocol. The neighbor discovery message and border routing message are received from an alien router. The border routing message includes foreign routing data that indicates a route to a destination among the second nodes. It is determined whether an interface on the alien router to the border network segment has a global IPv6 address. If not, then a fictive IPv6 address is generated, which includes a global prefix of an IPv6 address for the particular router and an interface identifier (ID) associated with the alien router. The fictive IPv6 address and the foreign routing data are inserted into a domain scope external advertisement message. The external advertisement message is sent to the first nodes.

In other sets of embodiments, an apparatus or software implements one or more steps of the above methods.

2.0 NETWORK OVERVIEW

Each packet communicated over a packet-switched network (PSN) typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular protocol typically indicates a type for the next protocol contained in its payload. The protocol in the payload is said to be encapsulated in the protocol of the header for the payload.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The internetwork header provides information defining the source and destination address within the network. Notably, the path may span multiple physical links. The internetwork header may be formatted according to the IPv4 or IPv6 protocols, which specify IP addresses of both a source and destination node at the end points of the logical path. Thus, the packet may "hop" from node to node along its logical path until it reaches the end node assigned to the destination IP address stored in the packet's internetwork header.

Routers and switches are network devices that determine which communication link or links to employ to support the progress of data packets through the network. A network node that determines which links to employ based on information in the internetwork header (layer 3) is called a router.

Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes. Routing protocols use control packets.

Routing information shared within the borders of one AS is exchanged using an interior gateway protocol (IGP). Example IGPs include the link state protocols OSPF and OSPFv3. OSPFv3 is described at the time of this writing in Internet Engineering Task Force (IETF) request for comments (RFC) 2740. The entire contents of RFC 2740 are hereby incorporated by reference as if fully set forth herein Another IGP, developed by CISCO SYSTEMS, INC.™ of San Jose, Calif. for use in its routers, is the Enhanced Interior Gateway Routing Protocol (EIGRP).

A level 3 routing protocol is used to exchange route summary and routing policy information across AS borders. For example, the Border Gateway Protocol (BGP) is a level 3 routing protocol. BGP is described at the time of this writing in RFC 4271, the entire contents of which are hereby incorporated by reference as if fully set forth herein. The BGP sends summary and policy information between adjacent boundary gateway nodes in different ASs using the External BGP (EBGP). The BGP sends summary and policy information between different boundary gateways in the same AS using the Internal BGP (IBGP).

2.1 EXAMPLE NETWORK

FIG. 1 illustrates an example network 100 with a border gateway router between sub-networks of different autonomous systems. Network 100 includes autonomous IPv6 sub-network 102 that constitutes AS 102 and autonomous IPv4 sub-network 104 that constitutes different, alien AS 104. Routers 120a, 120b, 120c are included in AS 102; and alien router 140 is included in alien AS 104.

The two AS 102 and AS 104 are connected by a network segment 110. A network segment is a portion of a network between adjacent intermediate network nodes. Router 120a and router 120b of AS 102 are connected by segment 110 to alien router 140 in AS 104. It is assumed for purposes of illustration that AS 102 uses OSPFv3 as a routing protocol and AS 104 uses EIGRP.

Because multiple routers from AS 102 are on network segment 110 linked to alien AS 104, the segment is a called a multi-access link. According to OSPFv3, one of the router 120a and the router 120b on the linking segment 110 is designated the autonomous system boarder gateway router (ASBR) for AS 102. For purposes of illustration, it is assumed that the router 120a is designated the ASBR 120a. The alien router 140 and the ASBR 120a communicate level 3 summarized routing information, for example using External BGP (EBGP). Thus ASBR 120a includes border gateway protocol process 130a and alien router 140 includes border gateway protocol process 130b, such as EBGP processes, to communicate control packets for the AS border gateway protocol.

According to the illustrated embodiments, a border routing process 124 on the ASBR 120a also includes a forward alien address process 150 to forward an address for alien router 140, when the alien router 140 does not have a global IP address.

Although two AS, four routers (including one ASBR) and one multi-access link segment are depicted in FIG. 1 for purposes of illustration, in other embodiments, more AS, more routers, more ASBRs, or more multi-access link segments, or some combination, are included.

An IPv4 address is typically represented as four decimal values between 0 and 255 separated by periods. IPv6 addresses are represented by eight blocks of 16-bit values separated by colons. Each 16-bit block is represented by four hexadecimal digits. Each hexadecimal digit corresponds to 4 bits that indicate decimal values from 0 through 15 and are represented by the numerals 0 through 9 and the letters a through f, respectively. For global unicast addresses used for routing to specific network interfaces over multiple heterogeneous networks, the first three blocks are called a global prefix, the fourth block is a subnet, and the last four blocks are a unique interface ID. A global unicast address is indicated by the value 010 in the first three bits of the first block. A link-local unicast address is good on only one network segment and can not be used for routing, and is indicated by the value 1111 1110 10 in the first ten bits of the first block (also designated fe80::/10, where the /10 indicates all addresses with the same leading 10 bits and the double colons indicate the remaining blocks in the address). An IPv4 address is indicated in IPv6 by six blocks of zeros, followed by two blocks with the 32 bits of the IPv4 address.

2.2 EXAMPLE FORWARDING ADDRESS

In general, ASBR 120*a* and alien router 140 discover each other on network segment 110 using neighbor discovery messages and neighbor solicitation messages, which stay on a network segment and are not forwarded. Such discovery messages are said to have segment scope. ASBR 120*a* learns the IP address of alien router 140 interface on segment 110 and alien router 140 learns the IP address of router 120*a* interface on segment 110. Similarly, router 120*b* and alien router 140 discover each other on network segment 110 using neighbor discovery messages. IPv4 requires that all interfaces on the same network segment belong to the same subnet, e.g., have the same value for the highest one or more octets. For purposes of illustration it is assumed that the interfaces on router 120*a*, router 120*b* and alien router 140 on network segment are 111.2.3.1, 111.2.3.2 and 111.2.3.4, respectively. These are global IPv4 addresses that can be used for routing over all connected networks.

After discovering each other, ASBR 120*a* and alien router 140 exchange GRP packets to establish EGRP communications. Because only one router on a multi-access link is an ASBR, router 120*b* is not an ASBR; and GRP packets are not exchanged with router 120*b*. ASBR 120*a* receives some routes from alien router 140 through GRP. As used here, a route is a path to an end node indicated by a network address, such as an IP address. For purposes of illustration it is assumed that the routes received are IPv4 routes 123.245.067.0/24, where the /24 indicates all addresses with the same leading 24 bits (123.245.067.xxx).

ASGR then redistributes those external routes into AS 102 using an OSPF external link state advertisement (LSA) message of domain scope. FIG. 2 illustrates an example domain scope advertisement message 240. The message 240 includes a data-link layer (L2) header 242, and a L2 payload 250. The L2 header 242 includes a source identifier (ID) field 244 that holds data that indicates a node that placed the message 240 on a segment. For example, on an Ethernet L2 segment, the source ID field 244 holds a 48-bit media access control (MAC) ID that uniquely identifies a network device among all manufacturers. The L2 header 242 also includes a destination identifier (ID) field 246 that holds data that indicates a node on a segment that should process the L2 payload 250. The field 246 holds data that indicates a particular device, such as the MAC ID for that device, which is intended to process the data in the L2 payload 250, such as the next hop node in AS 102, or a special code that indicates a group of devices on one or more segments.

The L2 payload 250 includes an internetwork layer (L3) header and a L3 payload. In the illustrated embodiments, the L3 header is an IP header 252 and the L3 payload is an IP payload 260. The IP header 252 includes a source IP address field 254 and a destination IP address field 256. The source IP address field 254 holds data that indicates a global IP address of the node that produced the IP payload 260. In the illustrated example, that node is ASBR 120*a*; thus field 254 holds data that indicates the global IP address of ASBR 120*a*. The destination IP address field 256 holds data that indicates a global IP address of the node that is to process the IP payload 260. In the illustrated embodiment, the destination IP address field 256 holds data that indicates an IP broadcast or multicast to every router in AS 102.

The IP payload 260 includes a type field 262, a subnet range field 264 and forwarding address field 266. The type field holds data, such as an OSPF header attribute, that indicates the payload 260 is an external LSA for OSPF. The address range field 264 holds data that indicates a contiguous range of one or more IP addresses that define a route or set of routes (called a subnet). In the illustrated example, the address range field 264 holds data that indicates a range of contiguous IP addresses for nodes in AS 104. The forwarding address field 266 holds data that indicates a routable IP address for the node from which the ABSR router received the foreign routes. In the illustrated example, forwarding address field 266 holds data that indicates the global IP address of alien router 140 (e.g., 111.2.3.4).

Although fields are shown as contiguous portions of message 240 in a particular order for purposes of illustration, in other embodiments, one or more fields are divided among more or fewer contiguous portions of the message in the same or a different order.

This external LSA message 240 is propagated from segment to segment in the AS 102 and eventually reaches an arbitrary node, such as router 120*c*. Router 120*c* uses the information to add routes indicated in subnet range field 264 (e.g., 123.245.067.0/24) as routes reachable from router 120*c*.

ASBR 120*a* and router 120*b* also send into AS 102 using OSPF internal link state advertisement (LSA) messages of domain scope, that both router 120*a* and router 120*b* can reach alien router 140 with a particular global IP address (e.g., 111.2.3.4). An internal LSA is similar to message 240 but the contents of type field 262 and subnet field 264 are different, and the forwarding address field 266 is omitted. The type field 262 holds data that indicates the message is an internal LSA. The contents of subnet range 264 indicate the global address of the alien node (e.g., 111.2.3.4).

Using well known routing techniques in OSPF, the cost to reach each of routers 120*a* and 120*b* is determined by every other router, e.g., router 120*c*, in AS 102. Thus router 120*c* can determine the cost to reach routers 120*a* and the cost to reach router 120*b*. Because both can reach alien router 140 on link segment 110, each router can determine the lowest cost to reach alien router 140. It is assumed for purposes of illustration that the cost to reach router 120*b* from router 120*c* is lower than the cost to reach router 120*a* from router 120*c*.

Router 120*c* associates the global IP address of alien router 140 (e.g., 111.2.3.4) with a link to a next hop toward 120*b* in a routing table. Router 120*c* also associates, with the link to the next hop toward 120*b* in a routing table, the external address range (e.g., 123.245.067.0/24) that has forwarding address to the alien router 140.

FIG. 3 illustrates an example routing table 310. The routing table 310 is a data structure that stores route information, i.e., a contiguous network address range and an interface on the router (e.g., an interface on router 120*c*) to use to communicate with that network address range. In some embodiments, one or more route attributes are also stored in the routing table 310. In the illustrated embodiment, the routing table 310 includes table record 311*a*, table record 311*b* and others indicated by ellipsis 319 (collectively referenced hereinafter as table records 311). Each table record 311 includes a contiguous address range field (e.g, 312*a*, 312*b*, among others, collectively referenced hereinafter as address range field 312) and a next hop interface field (e.g, 314*a*, 314*b*, among others, collectively referenced hereinafter as next hop interface field 314). In the illustrated embodiment each table record includes an attributes field (e.g, 316a, 316b, among others, collectively referenced hereinafter as attributes field 316). For example, the attributes field 316 indicates a cost to each address range and a destination MAC ID for field 246 in L2 headers 242 for data packets placed on that interface.

Thus, in the illustrated embodiment, a routing table on router 120c includes in one table record (e.g., 311a) data in address range field 312a that indicates the IP address of the alien router 140 (e.g., 111.2.3.4) in association with data in a next hop interface field 314a that indicates a next hop toward router 120b. In a second table record (e.g., 311b) data in address range field 312b indicates the IP address of the subnet in AS 104 (e.g., 123.245.067.0/24) in association with data in the next hop interface field 314b that indicates the same next hop toward router 120b.

By setting the forwarding address to the alien router 140 link IP address, ASBR indicates that packets for the external destinations should be forwarded to this IP address. This allows AS 102 to enjoy optimal routing since a shorter path to the alien router 140 IP address exists through router 120b, for at least some routers like router 120c, and this route avoids the extra hops in sending the packet to ASBR 120a.

Using IPv6, there is no requirement that the IP address of the interface on alien node 140 be on the same subnet as IP addresses of interfaces on other routers which face the same network segment (e.g, segment 110). As a result, in segment scope IP discovery messages, link-local IPv6 addresses are used. Thus neither a global IPv4 address nor a global IPv6 address is learned for alien node 140 by ASBR 120a. Link-local IPv6 addresses may not be used in routing and can not be used in the forwarding address field 266 or in the advertised address range field 264 or in routing table address range fields 312. Thus, using current approaches, forward addressing is not used and optimal routing is not available.

3.0 METHOD AT BORDER GATEWAY ROUTER (BR)

FIG. 4 illustrates an example method 400 for producing an IPv6 forwarding address for an alien border gateway router. Method 400 is an embodiment of the forward alien address process 150 in the border routing process 124 of ASBR router 120a depicted in FIG. 1. Although steps are shown in FIG. 4 in a particular order for purposes of illustration, in other embodiments one or more steps are performed in a different order or overlapping in time in series or parallel, or one or more steps are omitted or added, or the method is changed in some combination of ways.

In step 402, link-local addresses are discovered for interfaces on a network segment at a border between two different autonomous systems (AS) using different routing protocols. IPv6 link-local addresses are designed to be easily and automatically determined for any network nodes connected to a network segment. Thus IPv6 compliant routers using different routing protocols will automatically establish link-local addresses for their interfaces on a segment connecting them, such as segment 110. According to IPv6, a link-local address is generated with the value 1111 1110 10 in the first ten bits of the first block and an interface's MAC ID in the final 64 bits (last four blocks), thus allowing for device IDs up to 64 bits.

As a result of step 402, an ASBR (e.g., ASBR 120a) learns of a MAC address for an alien router (e.g., alien router 140). Thus, the neighbor discovery information is conveyed in OSPF messages. It is assumed for purposes of illustration that the link-local address learned for alien router 140 is fe80: 0000:0000:0000:0123:4567:89ab:cdef: in hexadecimal. Thus the learned MAC address for alien router 140 is 0123456789abcdef.

In step 410, foreign routes from an alien router are received in messages of a border gateway protocol, such as BGP. As a result of step 410, an ASBR (e.g., ASBR 120a) learns of routes in a different AS (e.g., AS 104) from alien router (e.g., alien router 140). For purposes of illustration it is assumed that the routes in AS 104 learned from alien router 140 are given by the IPv4 subnet 123.245.067.0/24.

In step 420, it is determined whether the interface on the alien router which faces the border segment has a global IP address. For example, it is determined if an IPv6 address learned in a neighbor discovery message begins with the three bits "010" for a global IPv6 address or an IPv4 address does not begin with local IPv4 addresses, such as 10.0.0.0/8 or 192.0.0.0/8. If so, control passes to step 422. In step 422, the global IP address is inserted into a forwarding address field in an external link state advertisement of the IPv6 routing protocol (e.g., in an external LSA of OSPFv3). If the global address is an IPv4 address, then the address inserted includes six blocks of "0000" hexadecimal digits preceding the IPv4 address to convert to an IPv6 address. Control then passes to step 440 to proceed with normal IPv6 routing.

If it is determined, in step 420, that the alien router does not have a global IP address, then control passes to step 430. For example, the link-local address "fe80:0000:0000:0000:0123: 4567:89ab:cdef" learned from alien router 140 begins with the ten bits of a link local address, and is not a global IP address; so control passes to step 430.

In step 430, a fictive IPv6 global address is generated for the alien router based on the global prefix portion of the border router. For purposes of illustration, it is assumed that the global IPv6 address of ASBR 120a is ":2001:0002:0003: 0004:0005:0006:0007:0008:" which includes a global prefix in the first three blocks. Thus the first three blocks of the fictive address are "2001:0002:0003:" In an illustrated embodiment, the remainder of the fictive IPv6 address includes a unique identifier associated with the alien router by the ASBR. For example, the MAC address of the alien router 140 learned during step 402 is used for the final four blocks. In this example, it is assumed that the fourth block of the fictive address, between the global prefix and the MAC ID is also taken from the ASBR. In other embodiments, the third block is any standard value, e.g., ":0000:" in hexadecimal. Thus, in the illustrated example, the fictive address is ":2001: 0002:0003:0004:0123:4567:89ab:cdef:" Control then passes to step 432, In step 432, the fictive address is inserted into the forwarding address field in an external LSA field, e.g., in field 266 of an OSPFv3 external LSA message 240. Step 432 includes sending the domain scope external LSA among the routers of the home AS for which the executing router serves as an ASBR.

As a result of step 432, in the illustrated example, the router 120c receives notice that subnet addresses 123.245.067/24 can be reached through the next hop interface to the global IPv6 address ":2001:0002:0003:0004:0123:4567:89ab: cdef:" and, in some embodiments, that this router is neighbor of ASBR 120a, with global IPv6 address of ":2001:0002: 0003:0004:0005:0006:0007:0008:".

In step 434, the fictive address is advertised on the border segment, such as by sending it in a link-state advertisement of segment scope. An advertisement of segment scope is similar to message 240 except that the forwarding address field 266 is omitted and the type field 262 includes data that indicates the advertisement is for the segment interfaces only and not to be forwarded to routers on a different segment.

As a result of step 434, any other router of the home AS on the border link segment also learn of the fictive address as a neighbor. For example, router 120b on border link segment 110 learns that a node with global IPv6 address ":2001:0002: 0003:0004:0123:4567:89ab:cdef:" is a neighbor on network segment 110.

In step 436, any neighbor solicitation message received on the border segment and requesting a MAC address for the fictive IPv6 address is resolved with the MAC address of the alien router, learned in step 402.

Thus, when router 120b receives a data packet destined for the fictive IP address, router 120 sends over segment 110 and, ASBR 120a receives, a solicitation message. The solicitation message is a L2 broadcast directed to the fictive IPv6 address as the destination IP address to resolve the L2 address for the destination IP address. This is analogous to an Address Resolution Protocol (ARP) request, well known in the art. Process 150 on ASBR 120a then sends in a segment scope advertisement message, defined in the OSPFv3RFC, the MAC address of the alien router 140 extracted from the last 64 bits of the fictive address in the illustrated embodiment, or associated with the fictive address in memory in some other embodiments. Control then passes to step 438.

As a result of step 436, the ASBR responds to a solicitation message to resolve global address "2001:0002:0003:0004: 0123:4567:89ab:cdef:" with the MAC address "0123456789abcdef" of alien node 140. Consequently, the routing table in the router that sent the segment scope solicitation is set so that the fictive address is associated with the MAC address of the alien router. For example, in some embodiments, on router 120b, the fictive address ":2001: 0002:0003:0004:0123:4567:89ab:cdef:" is in address range field 312, the interface to segment 110 is indicated by data in the next hop interface field 314, and the MAC address "0123456789abcdef" is in the attributes field 316.

In step 438, the fictive address is added to the routing table in association with the MAC address of the alien router. For example, in some embodiments, on ASBR 120a, the fictive address ":2001:0002:0003:0004:0123:4567:89ab:cdef:" is in address range field 312, the ASBR interface to segment 110 is indicated by data in the next hop interface field 314, and the MAC address "0123456789abcdef" is in the attributes field 316. Control then passes to step 440. In step 440, normal IPv6 routing continues.

In some embodiments, step 434, or step 436, or step 438, or some combination, is performed before step 432.

Using method 400, a fictive global IPv6 address which contains the Interface ID of the alien gateway router 140 is advertised and is locally resolved recursively at ASBR 120a to the alien gateway router's link local IPv6 address. Further, the ASBR advertises the fictive IPv6 address on the border segment and replies to all neighbor discovery (ND) and neighbor solicitation (NS) messages by indicating the MAC address of the gateway router (instead of the ASBR's own MAC address). This makes optimal routing available even when two domains are linked by a segment using link-local IPv6 addresses.

4.0 IMPLEMENTATION MECHANISMS—HARDWARE OVERVIEW

FIG. 5 illustrates a computer system 500 upon which an embodiment of the invention may be implemented. The preferred embodiment is implemented using one or more computer programs running on a network element such as a router device. Thus, in this embodiment, the computer system 500 is a router.

Computer system 500 includes a communication mechanism such as a bus 510 for passing information between other internal and external components of the computer system 500. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 510 includes many parallel conductors of information so that information is transferred quickly among devices coupled to the bus 510. One or more processors 502 for processing information are coupled with the bus 510. A processor 502 performs a set of operations on information. The set of operations include bringing information in from the bus 510 and placing information on the bus 510. The set of operations also typically include comparing two or more units of information, shifting positions of units of information, and combining two or more units of information, such as by addition or multiplication. A sequence of operations to be executed by the processor 502 constitute computer instructions.

Computer system 500 also includes a memory 504 coupled to bus 510. The memory 504, such as a random access memory (RAM) or other dynamic storage device, stores information including computer instructions. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of computer instructions. The computer system 500 also includes a read only memory (ROM) 506 or other static storage device coupled to the bus 510 for storing static information, including instructions, that is not changed by the computer system 500. Also coupled to bus 510 is a non-volatile (persistent) storage device 508, such as a magnetic disk or optical disk, for storing information, including instructions, that persists even when the computer system 500 is turned off or otherwise loses power.

The term computer-readable medium is used herein to refer to any medium that participates in providing information to processor 502, including instructions for execution. Such a medium may take many forms, including, but not limited to, non-volatile media, volatile media and transmission media. Non-volatile media include, for example, optical or magnetic disks, such as storage device 508. Volatile media include, for example, dynamic memory 504. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH- EPROM, or any other memory chip or cartridge, a carrier wave, or any other medium from which a computer can read.

Information, including instructions, is provided to the bus 510 for use by the processor from an external terminal 512, such as a terminal with a keyboard containing alphanumeric keys operated by a human user, or a sensor. A sensor detects conditions in its vicinity and transforms those detections into signals compatible with the signals used to represent information in computer system 500. Other external components of terminal 512 coupled to bus 510, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 512. In some embodiments, terminal 512 is omitted.

Computer system 500 also includes one or more instances of a communications interface 570 coupled to bus 510. Communication interface 570 provides a two-way communication coupling to a variety of external devices that operate with their own processors, such as printers, scanners, external disks, and terminal 512. Firmware or software running in the computer system 500 provides a terminal interface or character-based command interface so that external commands can be given to the computer system. For example, communication interface 570 may be a parallel port or a serial port such as an RS-232 or RS-422 interface, or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 520, is coupled to bus 510. The special purpose hardware is configured to perform operations not performed by processor 502 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 500 includes switching system 530 as special purpose hardware for switching information for flow over a network. Switching system 530 typically includes multiple communications interfaces, such as communications interface 570, for coupling to multiple other devices. In general, each coupling is with a network link 532 that is connected to another device in or attached to a network, such as local network 580 in the illustrated embodiment, to which a variety of external devices with their own processors are connected. In some embodiments an input interface or an output interface or both are linked to each of one or more external network elements. Although three network links 532a, 532b, 532c are included in network links 532 in the illustrated embodiment, in other embodiments, more or fewer links are connected to switching system 530. Network links 532 typically provides information communication through one or more networks to other devices that use or process the information. For example, network link 532b may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590. A computer called a server 592 connected to the Internet provides a service in response to information received over the Internet. For example, server 592 provides routing information for use with switching system 530.

The switching system 530 includes logic and circuitry configured to perform switching functions associated with passing information among elements of network 580, including passing information received along one network link, e.g. 532a, as output on the same or different network link, e.g., 532c. The switching system 530 switches information traffic arriving on an input interface to an output interface according to pre-determined protocols and conventions that are well known. In some embodiments, switching system 530 includes its own processor and memory to perform some of the switching functions in software. In some embodiments, switching system 530 relies on processor 502, memory 504, ROM 506, storage 508, or some combination, to perform one or more switching functions in software. For example, switching system 530, in cooperation with processor 504 implementing a particular protocol, can determine a destination of a packet of data arriving on input interface on link 532a and send it to the correct destination using output interface on link 532c. The destinations may include host 582, server 592, other terminal devices connected to local network 580 or Internet 590, or other routing and switching devices in local network 580 or Internet 590.

The invention is related to the use of computer system 500 for implementing the techniques described herein. According to one embodiment of the invention, those techniques are performed by computer system 500 in response to processor 502 executing one or more sequences of one or more instructions contained in memory 504. Such instructions, also called software and program code, may be read into memory 504 from another computer-readable medium such as storage device 508. Execution of the sequences of instructions contained in memory 504 causes processor 502 to perform the method steps described herein. In alternative embodiments, hardware, such as application specific integrated circuit 520 and circuits in switching system 530, may be used in place of or in combination with software to implement the invention. Thus, embodiments of the invention are not limited to any specific combination of hardware and software.

The signals transmitted over network link 532 and other networks through communications interfaces such as interface 570, which carry information to and from computer system 500, are example forms of carrier waves. Computer system 500 can send and receive information, including program code, through the networks 580, 590 among others, through network links 532 and communications interfaces such as interface 570. In an example using the Internet 590, a server 592 transmits program code for a particular application, requested by a message sent from computer 500, through Internet 590, ISP equipment 584, local network 580 and network link 532*b* through communications interface in switching system 530. The received code may be executed by processor 502 or switching system 530 as it is received, or may be stored in storage device 508 or other non-volatile storage for later execution, or both. In this manner, computer system 500 may obtain application program code in the form of a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to an infra-red signal, a carrier wave serving as the network link 532*b*. An infrared detector serving as communications interface in switching system 530 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502 or switching system 530.

5.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising the steps of:
    receiving, at a particular router, a neighbor discovery message through an interface to a border network segment between a first plurality of nodes for routing with Internet Protocol (IP) version 6 (IPv6) using a first routing protocol and a different second plurality of nodes for routing using a different second routing protocol, wherein the particular node is among the first plurality of nodes and the neighbor discovery message is received from an alien router among the second plurality of nodes, wherein the first routing protocol comprises an Enhanced Interior Gateway Router Protocol (EIGRP) configured to set a forwarding address (FA) field in advertisement messaging associated with external routes involving the particular router, and wherein the alien router and the particular router communicate level 3 summarized routing information using an External Border Gateway Protocol (EBGP);
    receiving, from the alien router through the interface, a border routing message that includes foreign routing data that indicates a route to a destination in the second plurality of nodes;
    determining whether an interface on the alien router to the border network segment has a global IP address, wherein the particular router includes a forward alien address process configured to forward an address for the alien router when the alien router does not have the global IP address; and
    if it is determined that the interface on the alien router does not have a global IP address, then performing the steps of:
        generating a fictive IPv6 address that includes data that indicates a global prefix of an IPv6 address for the particular router and an interface identifier (ID) associated with the alien router;
        inserting the fictive IPv6 address and the foreign routing data into a domain scope external advertisement message;
        sending the external advertisement message to the first plurality of nodes;
        receiving a neighbor solicitation message that indicates a request to resolve a MAC identifier for the fictive IPv6 address; and
        sending a neighbor advertisement message that includes data that indicates the MAC identifier for the interface on the alien router.

2. A method as recited in claim 1, further comprising, if it is determined that the interface on the alien router does not have a global IPv6 address, then performing the steps of determining a media access control (MAC) identifier for the interface on the alien router based on the neighbor discovery message.

3. A method as recited in claim 2, further comprising, if it is determined that the interface on the alien router does not have a global IPv6 address, then performing the steps of:
    receiving from a node of the first plurality of nodes a data packet with an IP header that includes a destination field that indicates the route to the destination in the second plurality of nodes;
    encapsulating the IP portion of the data packet in a forwarded data packet with a data-link layer protocol directed to the MAC identifier for the interface on the alien router; and
    sending the forwarded data packet through the interface onto the border network segment.

4. A method as recited in claim 2, further comprising, if it is determined that the interface on the alien router does not have a global IPv6 address, then performing the steps of:
    inserting the fictive IPv6 address into an advertisement message that is sent to nodes that share a network segment; and
    sending, through the interface onto the border network segment, the advertisement message.

5. A method as recited in claim 1, said step of receiving the neighbor solicitation message further comprising receiving a segment scope neighbor solicitation message that is sent only to nodes that share a network segment.

6. A method as recited in claim 1, said step of sending the neighbor advertisement message further comprising sending a segment scope neighbor advertisement message that is sent only to nodes that share a network segment.

7. An apparatus comprising:
    means for receiving a neighbor discovery message through an interface to a border network segment between a first plurality of nodes for routing with Internet Protocol (IP) version 6 (IPv6) using a first routing protocol and a different second plurality of nodes for routing using a different second routing protocol, wherein the apparatus is among the first plurality of nodes and the neighbor discovery message is received from an alien router among the second plurality of nodes, wherein the first routing protocol comprises an Enhanced Interior Gateway Router Protocol (EIGRP) configured to set a forwarding address (FA) field in advertisement messaging associated with external routes involving a particular router, and wherein the alien router and the particular router communicate level 3 summarized routing information using an External Border Gateway Protocol (EBGP);

means for receiving, from the alien router through the interface, a border routing message that includes foreign routing data that indicates a route to a destination in the second plurality of nodes;

means for determining whether the alien router has a global IP address, wherein the particular router includes a forward alien address process configured to forward an address for the alien router when the alien router does not have the global IP address; and means for substituting a fictive address, if it is determined that the alien router does not have a global IPv6 address, comprising means for generating a fictive IPv6 address that includes data that indicates a global prefix of an IPv6 address for the particular router and an interface identifier (ID) associated with the alien router;

means for inserting the fictive IPv6 address and the foreign routing data into a domain scope external advertisement message;

means for sending the advertisement message to the first plurality of nodes;

means for receiving a neighbor solicitation message that indicates a request to resolve a MAC identifier for the fictive IPv6 address; and means for sending a neighbor advertisement message that includes data that identifies the MAC identifier for the interface on the alien router.

8. An apparatus as recited in claim 7, further comprising means for determining a media access control (MAC) identifier for the interface on the alien router based on the neighbor discovery message if it is determined that the interface on the alien router does not have a global IPv6 address.

9. An apparatus as recited in claim 8, further comprising means for forwarding an IP packet if it is determined that the interface on the alien router does not have a global IPv6 address, wherein the means for forwarding the IP packet comprises:

means for receiving from a node of the first plurality of nodes a data packet with an IP header that includes a destination field that indicates the route to the destination in the second plurality of nodes;

means for encapsulating the IP portion of the data packet in a forwarded data packet with a data-link layer protocol directed to the MAC identifier for the interface on the alien router; and means for sending the forwarded data packet through the interface onto the border network segment.

10. An apparatus as recited in claim 8, further comprising means for advertising the fictive address if it is determined that the interface on the alien router does not have a global IPv6 address, wherein said means for advertising the fictive address comprises:

means for inserting the fictive IPv6 address into an advertisement message that is sent to nodes that share a network segment; and means for sending, through the interface onto the border network segment, the advertisement message.

11. An apparatus as recited in claim 8, said means for receiving the neighbor solicitation message further comprising means for receiving a segment scope neighbor solicitation message that is sent only to nodes that share a network segment.

12. An apparatus comprising:

a first network interface that is configured to communicate a data packet with a first packet-switched network of a first plurality of nodes that are routing with Internet Protocol (IP) version 6 (IPv6) using a first routing protocol;

a second network interface that is configured to communicate a data packet with a border network segment that is in communication with a different second plurality of nodes that are routing using a different second routing protocol; and logic encoded on a non-transitory tangible media for execution by a processor and, when executed by a processor, operable to perform the steps of:

receiving a neighbor discovery message through the second network interface from a different, alien router on the border network segment, wherein the first routing protocol comprises an Enhanced Interior Gateway Router Protocol (EIGRP) configured to set a forwarding address (FA) field in advertisement messaging associated with external routes involving a particular router, and wherein the alien router and the particular router communicate level 3 summarized routing information using an External Border Gateway Protocol (EBGP);

receiving, from the alien router through the second network interface, a border routing message that includes foreign routing data that indicates a route to a destination in the second plurality of nodes;

determining whether an interface on the alien router to the border network segment has a global IP address, wherein the particular router includes a forward alien address process configured to forward an address for the alien router when the alien router does not have the global IP address; and if it is determined that the interface on the alien router does not have a global IP address, then performing the steps of:

generating a fictive IPv6 address that includes data that indicates a global prefix of an IPv6 address for the apparatus and an interface identifier (ID) associated with the alien router;

inserting the fictive IPv6 address and the foreign routing data into a domain scope external advertisement message;

sending the external advertisement message through the first network interface to the first plurality of nodes;

receiving a neighbor solicitation message that indicates a request to resolve a MAC identifier for the fictive IPv6 address; and sending a neighbor advertisement message that includes data that identifies the MAC identifier for the interface on the alien router.

13. An apparatus as recited in claim 12, wherein the logic when executed, is further operable, if it is determined that the interface on the alien router does not have a global IPv6 address, to perform the step of determining a media access control (MAC) identifier for the interface on the alien router based on the neighbor discovery message.

14. An apparatus as recited in claim 13, wherein the logic when executed, is further operable, if it is determined that the interface on the alien router does not have a global IPv6 address, to perform the steps of:

receiving from a node of the first plurality of nodes a data packet with an IP header that includes a destination field that indicates the route to the destination in the second plurality of nodes;

encapsulating the IP portion of the data packet in a forwarded data packet with a data-link layer protocol directed to the MAC identifier for the interface on the alien router; and sending the forwarded data packet through the second network interface onto the border network segment.

15. An apparatus as recited in claim 13, wherein the logic when executed, is further operable, if it is determined that the interface on the alien router does not have a global IPv6 address, to perform the steps of:

inserting the fictive IPv6 address into an advertisement message that is sent to nodes that share a network segment; and sending the advertisement through the second network interface onto the border network segment.

16. An apparatus as recited in claim 13, said step of receiving the neighbor solicitation message further comprising receiving a segment scope neighbor solicitation message that is sent only to nodes that share a network segment.

17. An apparatus as recited in claim 13, said step of sending the neighbor advertisement message further comprising sending a segment scope neighbor advertisement message that is sent only to nodes that share a network segment.

* * * * *

UNITED STATES PATENT AND TRADEMARK OFFICE
CERTIFICATE OF CORRECTION

| | | |
|---|---|---|
| PATENT NO. | : 7,804,848 B2 | Page 1 of 1 |
| APPLICATION NO. | : 11/679864 | |
| DATED | : September 28, 2010 | |
| INVENTOR(S) | : Sina Mirtorabi et al. | |

It is certified that error appears in the above-identified patent and that said Letters Patent is hereby corrected as shown below:

Title Page 1, "(75) Inventors:," second line, please correct the inventor name from Abhav Roy to read Abhay Roy.

Signed and Sealed this

Sixteenth Day of November, 2010

David J. Kappos
*Director of the United States Patent and Trademark Office*